(12) United States Patent
Pou et al.

(10) Patent No.: US 6,395,225 B1
(45) Date of Patent: May 28, 2002

(54) SULPHYDRYL ACID AND IMIDAZOLINE SALTS AS INHIBITORS OF CARBON CORROSION OF IRON AND FERROUS METALS

(75) Inventors: Tong Eak Pou, Courdimanche; Stephane Fouquay, Mont Saint-Aignan, both of (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/381,181

(22) PCT Filed: Mar. 4, 1998

(86) PCT No.: PCT/FR98/00351

§ 371 (c)(1),
(2), (4) Date: Nov. 24, 1999

(87) PCT Pub. No.: WO98/41673

PCT Pub. Date: Sep. 24, 1998

(30) Foreign Application Priority Data

Mar. 18, 1997 (FR) .............................. 97 03286
Feb. 3, 1998 (FR) .............................. 98 01226

(51) Int. Cl.[7] .............................................. C23F 11/00
(52) U.S. Cl. ............................ 422/16; 422/14; 422/15; 422/17; 422/18
(58) Field of Search .............................. 422/14, 15, 16, 422/17, 18

(56) References Cited

U.S. PATENT DOCUMENTS

| 2,865,817 A | * 12/1958 | Clausen ....................... 202/37 |
| 3,300,333 A | * 1/1967 | Page ......................... 117/120 |
| 3,629,104 A | 12/1971 | Maddox ................ 252/8.55 E |
| 3,775,320 A | 11/1973 | Vigo et al. .................. 252/33.6 |
| 4,339,349 A | 7/1982 | Martin et al. ........... 262/389 A |
| 5,098,934 A | * 3/1992 | Vevert et al. ................ 514/513 |
| 5,514,505 A | * 5/1996 | Limburg et al. .............. 430/41 |

FOREIGN PATENT DOCUMENTS

| GB | 2190670 | * 11/1987 | ........... C23F/11/12 |
| GB | 2324084 | * 10/1988 | ........... C23F/11/16 |
| GB | 2319530 | 5/1998 | |
| SU | 732258 | 5/1980 | |

* cited by examiner

*Primary Examiner*—Robert J. Warden, Sr.
*Assistant Examiner*—Imad Soubra
(74) *Attorney, Agent, or Firm*—Smith, Gambrell & Russell, LLP

(57) ABSTRACT

The invention concerns inhibitor compositions based on fatty sulphydryl acid and poly(ethyleneamino)imidazoline salts for considerably reducing the corrosive effect of carbon brine on iron and ferrous metals. These compositions are as efficient when the corrosive medium is driven with a high flowrate and in biphasic brine/oil medium.

7 Claims, 2 Drawing Sheets

Figure 1: Inhibitory efficacy of dynamic $CO_2$ corrosion
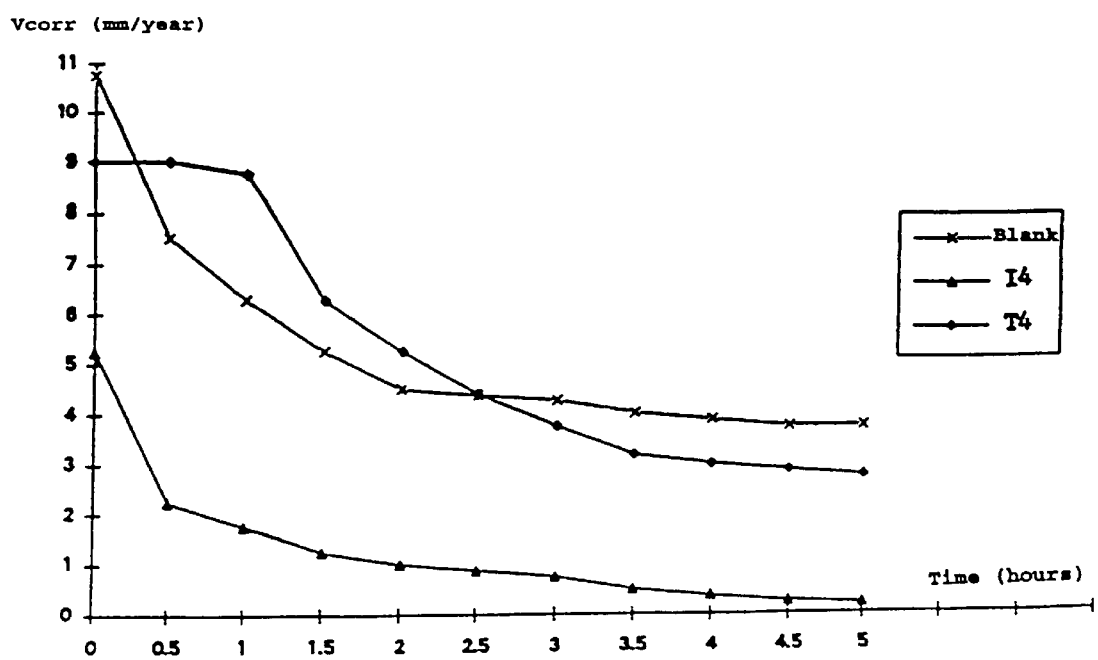

Figure 2: Corrosion-inhibiting efficacy of the formulae studied
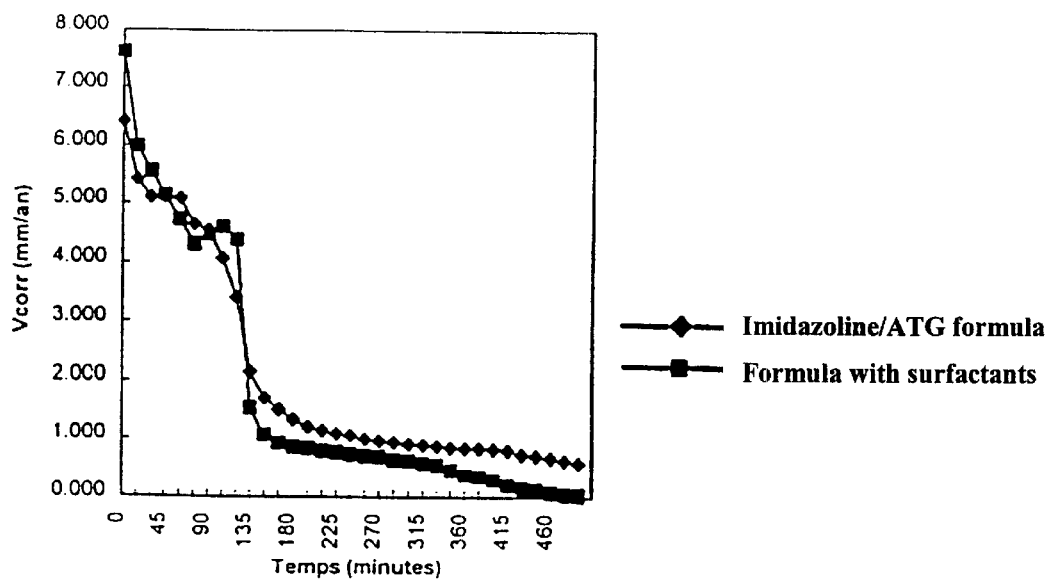

SULPHYDRYL ACID AND IMIDAZOLINE SALTS AS INHIBITORS OF CARBON CORROSION OF IRON AND FERROUS METALS

TECHNICAL FIELD

The invention relates to the inhibition of corrosion of iron and of ferrous metals in carbonic brines. For the purposes of the invention, the term carbonic brines is understood to refer to carbon dioxide-charged aqueous solutions of inorganic salts.

BACKGROUND ART ($C_{10}$–$C_{22}$)Alkyl-poly(ethyleneamino)imidazolines (or 2-alkyl poly-3-(ethyleneamino)-1,3-diazolines) are known to be excellent corrosion inhibitors for iron and ferrous metals in sulphydric brines, or sulphydric and carbonic brines, and many publications have been devoted to the mechanism of this inhibition. To mention but the most recent: Preparation of Corrosion Inhibitor for Water Flooding in Oilfield and Study of its Mechanism, Lu Zhu et al., Water Treatments, 8 (1993), 253–264, China Ocean Press or Hydrogen Sulphide Corrosion of Steel, Mechanism of Action of Imidazoline Inhibitors, A. J. Szyprowski, Proceedings of the 8th European Symposium on Corrosion Inhibitors, Ann. Univ. Ferrara, N. S., Sez. V, suppl. N.10, 1995. However, curiously, these compounds are very ineffective in corrosive media containing only $CO_2$, which are nevertheless apparently less aggressive, and this motivated the search for more complex similar structures such as N,N'-substituted imidazolines (U.S. Pat. No. 5,322,640) or adducts of imidazolinones and of urea (GB2,190,670).

DISCLOSURE OF INVENTION

It has now been found that salts of mercapto acids and of alkyl-polyethyleneamino-imidazolines are very powerful corrosion inhibitors for iron and ferrous metals in carbon dioxide-charged aqueous solutions of inorganic salts.

The present invention consists of corrosion-inhibiting compositions containing at least one alkyl-poly(ethyleneamino)-imidazoline or 2-alkyl-poly-3-(ethyleneamino)-1,3-diazoline, corresponding to the general formula

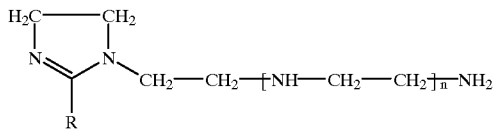

in which R is a linear or branched, saturated or unsaturated hydrocarbon chain containing 10 to 22 carbon atoms, and in which n is a number from 0 to 3, and at least one mercapto acid corresponding to the general formula

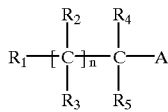

with
n=0 to 3,
$R_1$=H or SH,
$R_2$ and $R_3$, together or independently, =$C_{1-4}$, $CON(R_6)(R_7)$ or $COOR_8$,
$R_4$ and $R_5$, together or independently, =OH, $NH_2$ or SH when $R_1 \neq$ SH,
$R_6$ and $R_7$, together or independently, =H or $C_{1-4}$,
$R_8$=H or $C_{1-8}$,
it being possible for $R_2$ to $R_5$ to be included in an aliphatic ring,
it being possible for $R_3$ and $R_5$ to be included in an aromatic ring when n=1,
A being a COOH, $SO_3H$, $OSO_3H$, $PO_3H$ or $OPO_3H$ acid group,
the molar ratio between the mercapto acid component(s) and the imidazoline component(s) being from 1.0 to 1.5.

The alkylimidazolines forming part of the composition of the inhibitors of the invention are products of condensation-cyclization of saturated or unsaturated fatty acids containing 10–22 carbon atoms, with polyethylene-polyamines (diethylenetriamine DETA and its higher homologues, triethylenetetramine TETA, tetraethylenepentamine TEPA and pentaethylenehexamine PEHA). These imidazolines are obtained under conditions that are well known to those skilled in the art (introduction of the polyamine into the molten fatty acid, in the presence of oxalic acid which acts as cyclization accelerator, raising the temperature to 200° C.–220° C. and maintaining it at this stage until the water of condensation has been entirely removed).

The preferred mercapto acids are mercaptocarboxylic acids,

and among these mercaptoacetic acid,

and mercaptopropionic acid

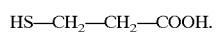

The compositions according to the invention are advantageously in the form of aqueous solutions containing 10%–75% active material. Solutions containing 20–40% by weight in water or in a mixture of water and a water-miscible solvent are preferred, isobutanol, butyl glycol, monoethylene glycol or mixtures thereof being preferred solvents. They are prepared very simply by mixing the constituents together while cold or warm. They are used at effective concentrations of 5 to 200 ppm, preferably at about 20 ppm of the preparation (calculated as imidazoline mercaptocarboxylate component relative to the corrosive medium).

These water-soluble compositions, modelled on the traditional but insufficiently effective imidazoline acetates, inhibit the static corrosion of iron and ferrous metals in carbonic brines of high salinity at high temperature. They also inhibit its dynamic corrosion under the conditions for the production of gas, and their efficacy is maintained in two-phase media such as carbonic brines/oils. However, in order to enhance their performance when the hydrocarbon phase is a crude petroleum oil and when the aqueous phase is highly saline, i.e. when its salt concentration is greater than 1 g/l, they are advantageously combined with cationic, amphoteric and nonionic surfactants from the group consisting of alkyltrimethyl- or alkyldimethylbenzylammonium salts, alkylaminopropionic acids and oxyethylenated alkylamines, in which the alkyl chain is a saturated or unsaturated chain containing from 12 to 22 carbon atoms. This effect is unexpected; it is not impossible for it to be due to the improvement to the partition of the mercaptocarboxylate/imidazoline system between the oily phase and the aqueous phase.

The mercaptocarboxylate/imidazoline/surfactant compositions typically comprising 20 to 40% imidazoline mercaptocarboxylate, 2 to 5% quaternary ammonium, 2 to 5% amphoteric surfactant and 2 to 10% oxyethylenated amine are also subjects of the present invention.

The examples which follow will allow a better understanding of the invention to be gained.

EXAMPLES

Example 1

Preparation of Mercapto Acid/Imidazoline Inhibitory Compositions

Various imidazolines are prepared by condensing 1 mol of fatty acid with 1.15 mol of tetraethylenepentamine (TEPA) in the presence of 1% by weight of oxalic acid dihydrate. The amine is introduced into the fatty acid-oxalic acid mixture at a temperature of 140° C., after which the reaction mixture is brought to 160° C. and maintained at this temperature for 1 h 30, then brought to 200° C.–220° C. for 16 h. The inhibitory compositions consist of imidazolines (30% by weight), thioglycolic acid (5% by weight) and isobutanol (65% by weight). The corresponding controls consist of imidazolines, glacial acetic acid and isobutanol in the same proportions.

The inhibitory compositions I1, I2, I3 and I4, respectively, are thus prepared with imidazolines obtained from tall-oil, from coconut fatty acid, from oleic fatty acid and from rapeseed oil, and the corresponding control compositions T1 to T4 (acetic) are prepared.

All of these compositions are homogeneous liquids of oily appearance.

Example 2

Measurements of static corrosion are carried out in a medium consisting of an aqueous solution containing, in grams per liter:

| | |
|---|---|
| NaCl | 277.50 |
| KCl | 6.43 |
| $CaCl_2 \cdot 2H_2O$ | 21.50 |
| $MgCl_2 \cdot 6H_2O$ | 33.77 |
| $BaCl_2 \cdot 2H_2O$ | 0.20 |
| $SrCl_2 \cdot 2H_2O$ | 0.34 |
| $FeCl_2$ | 0.06 |

This medium is de-aerated beforehand with nitrogen and then saturated with $CO_2$. Its pH is 5.5.

The corrosion test is carried out on a test piece of 1 $cm^2$ XC18 steel, in a device for measuring polarization resistance, the corrosive medium being at 80° C., the $CO_2$ pressure being 1 bar. The results are reported in the table below, in which they are expressed, as is traditional, as a percentage of protection.

| | PERCENTAGE OF PROTECTION | | | | | | | |
|---|---|---|---|---|---|---|---|---|
| | Control formulae (acetic) | | | | Formulae according to the invention (thioglycolic) | | | |
| doses ppm | T1 | T2 | T3 | T4 | I1 | I2 | I3 | I4 |
| 1 | ~0 | ~0 | ~0 | ~0 | ~0 | ~0 | 8 | 7 |
| 7 | ~0 | ~0 | ~0 | ~0 | 17 | 25 | 16 | 22 |
| 5 | ~0 | ~0 | ~0 | ~0 | 64 | 60 | 71 | 69 |
| 10 | ~0 | ~0 | ~0 | ~0 | 81 | 82 | 83 | 86 |
| 20 | ~0 | ~0 | ~0 | ~0 | 84 | 89 | 85 | 87 |
| 50 | ~0 | ~0 | ~0 | ~0 | 85 | 90 | 84 | 90 |
| 100 | ~0 | ~0 | ~0 | ~0 | 86 | 92 | 83 | 92 |
| 200 | 18 | ~0 | ~0 | ~0 | 86 | 94 | 88 | 94 |

These results unequivocally reflect the efficacy of the imidazoline/thioglycolic acid compositions according to the invention.

Example 3

Test of Dynamic Corrosion

The test simulates the conditions of gas production. The corrosive medium consists of an aqueous solution of NaCl at 1 g/l, de-aerated beforehand with nitrogen and then saturated with $CO_2$, brought to 60° C. and circulating at a speed of 13 meters per second in a so-called "Jet Impingement" device (see: Correlation of Steel Corrosion in Pipe Flow with Jet Impingement and Rotating Cylinder Test, K. D. Efird et al., Corrosion, vol. 49, No. 12, p. 992, 1993). The test body subjected to corrosion under these conditions is a test piece of XC18 steel in the shape of a ring 1 mm in thickness and with an internal radius of 2.5 mm, whose rate of corrosion is measured by polarization resistance.

FIG. 1 reproduces the results obtained from a blank test (free of inhibitor) and in the presence of compositions T4 and I4 (formulations based on rapeseed imidazoline acetate and thioglycolate respectively). The inhibitory compositions were used at a dose of 20 ppm (expressed as volumes of preparation relative to the corrosive medium). These results unambiguously bear witness to the efficacy of the inhibitor according to the invention under the conditions of corrosion by carbonic brine animated with a high flow rate.

Example 4

Test of Corrosion in a Two-phase Medium

The corrosive medium is a mixed phase consisting of 90% by volume of an aqueous solution of sodium chloride at 1 g/l and 10% paraffin oil. The system is de-aerated beforehand by bubbling nitrogen through, and is then saturated with $CO_2$. The working temperature is 60° C. Homogeneity of the medium is ensured in the assembly by means of gentle magnetic stirring.

The corrosion inhibitor used is composition I4 (based on rapeseed imidazoline). It is used at a dose of 20 ppm (calculated as volume of inhibitory preparation relative to the total volume of the corrosive medium). The rate of corrosion is estimated, as in the previous examples, by polarization resistance, in a test procedure summarized below.

| Conditions | Rate of corrosion in the aqueous phase (in mm/year) |
|---|---|
| A. Precorrosion in aqueous phase after precorrosion for 12 hours | 1.5 mm/year |
| B. Introduction of the oil after 2 hours of stabilization | 1.4 mm/year |
| C. Introduction of the inhibitor via the oil phase after 12 hours of stabilization | 0.002 mm/year |

Example 5
Crude Petroleum/Very Saline Brine Two-phase Medium

The corrosion test is carried out in a corrosive medium consisting of 10% of a crude petroleum oil from the Gabon taken at the site, and 90% reconstituted site water with the following composition:

| | |
|---|---|
| $SrCl_2.6H_2O$ | 0.34 g/l |
| $BaCl_2.2H_2O$ | 0.2 g/l |
| $MgCl_2.6H_2O$ | 33.77 g/l |
| KCl | 6.43 g/l |
| $CaCl_2.2H_2O$ | 21.5 g/l |
| $FeCl_2.4H_2O$ | 0.06 g/l |
| NaCl | 277.5 g/l |

At the time of the test, 1.8 g/l of acetic acid are added and the mixture is acidified by a strong acid (HCl) in order to reach a pH of 5.5. It is de-aerated with nitrogen for one hour and then saturated with $CO_2$ for one hour. 0.05 g/l of $NaHCO_3$ is added, bubbling of $CO_2$ is commenced and the temperature is raised to 80° C., which takes about ½ hour.

The rate of corrosion of the steel in the brine is measured by polarization resistance, a measurement being repeated every ¼ hour for one hour. Crude Gabon petroleum oil (10% relative to the brine) presaturated with $CO_2$ and brought to 80° is then added, and monitoring of the rate of corrosion is continued by measuring the polarization resistance every ¼ hour for a further one hour. 20 ppm of corrosion inhibitor (as imidazoline mercaptocarboxylate) are then added and the change in the rate of corrosion is monitored by measuring the polarization resistance, this being carried out every ¼ hour for four hours.

A simple inhibitory composition consisting (as a per cent by weight) of:

| | |
|---|---|
| Imidazoline | 25 |
| Mercaptoacetic acid | 5 |
| Butyl glycol | 25 |
| Monoethylene glycol | 25 |
| Water | 20 | is compared with an inhibitory composition improved by adding surfactants as mentioned above, consisting (as a per cent by weight) of:

| | |
|---|---|
| Imidazoline | 20 |
| Mercaptopropionic acid | 5 |
| Monopropylene glycol | 60 |
| Coconut dimethylbenzylammonium chloride at 50% | 5% |
| Coconut monoamine with 11 mol of ethylene oxide | 5% |
| Coconut aminopropionic acid at 60% | 5% |

In these compositions, the imidazoline is that of Example 1. The coconut dimethylbenzylammonium chloride used is Noramium® DA50 from CECA S.A., which is presented at a concentration of 50% active material, the oxyethylenated coconut monoamine is the oxyethylenated product containing on average 11 mol of ethylene oxide, sold by CECA S.A. under the name Noramox® C11, and the coconut aminopropionic acid is Amphoram® CP1 from CECA S.A., which is presented for sale at a concentration of 60% active material.

The changes in the rate of corrosion as a function of time in the presence of 20 ppm of the first formulation and of the second formulation, respectively, are represented in FIG. 2. It is observed that the values of the residual rate of corrosion after contact for 8 hours 30 become established at 0.60 mm/year and 0.035 mm/year respectively, which bears witness to the real efficacy of the second formulation under the test conditions.

What is claimed is:

1. Compositions for inhibiting the corrosion of iron and ferrous metals in carbonic brines, comprising, as active constituent,
   at least one alkyl-poly(ethyleneamino)-imidazoline or 2-alkyl-poly-3-(ethyleneamino)-1,3-diazoline, corresponding to the general formula

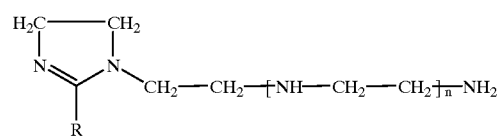

in which R is a linear or branched, saturated or unsaturated hydrocarbon chain containing 10 to 22 carbon atoms, and in which n is a number from 0 to 3, and at least one mercapto acid corresponding to the general formula

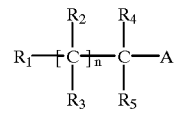

with
n=0 to 3,
$R_1$=H or SH,
$R_2$ and $R_3$, together or independently, $=C_{1-4}$, $CON(R_6)(R_7)$ or $COOR_8$,
$R_4$ and $R_5$, together or independently, =OH, $NH_2$ or SH when $R_1 \neq SH$,
$R_6$ and $R_7$, together or independently, =H or $C_{1-4}$,
$R_8$=H or $C_{1-8}$,
it being possible for $R_2$ to $R_5$ to be included in an aliphatic ring,
it being possible for $R_3$ and $R_5$ to be included in an aromatic ring when n=1,
A being a COOH, $SO_3H$, $OSO_3H$, $PO_3H$ or $OPO_3H$ acid group,
the molar ratio between the mercapto acid component(s) and the imidazoline component(s) being from 1.0 to 1.5.

2. Inhibitory compositions according to claim 1, wherein the mercapto acid is a mercaptocarboxylic acid.

3. Inhibitory compositions according to claim 1, wherein the mercapto acid is mercaptoacetic acid or mercaptopropionic acid.

4. Inhibitory compositions according to claim 1, further comprising, besides mercapto acids and 2-alkyl-poly(3-ethyleneamino)-1,3-diazolines, at least one cationic surfactant of the alkyltrimethyl- or alkyldimethylbenzylammonium salt type, an amphoteric surfactant of the alkylaminopropionic acid type and a nonionic surfactant of the oxyethylenated alkylamine type, wherein the alkyl chain is a saturated or unsaturated chain containing from 12 to 22 carbon atoms.

5. Inhibitory compositions according to claim 4, further comprising from 20 to 40% imidazoline mercaptocarboxylates, 2 to 5% quaternary ammonium, 2 to 5% amphoteric surfactant and 2 to 10% oxyethylenated amine, dissolved in an aqueous or water-miscible solvent.

6. Inhibitory compositions according to claim 5, wherein the water-miscible solvent is selected from the group consisting of isobutanol, butyl glycol, monoethylene glycol and a mixture of these solvents.

7. Process for inhibiting corrosion of iron and ferrous metals in carbonic brines, in the presence or absence of oils, at rest or animated with a high flow rate, comprising introducing into a corrosive medium from 5 to 200 ppm, expressed as weight of inhibiting active principles, mercapto acids and alkylpoly(ethyleneamino)-imidazolines, relative to the volume of the corrosive medium, of the compositions of claim 1.

* * * * *